United States Patent
Wiltz, Jr. et al.

(10) Patent No.: US 8,133,930 B2
(45) Date of Patent: Mar. 13, 2012

(54) POLYURETHANE FOAMS MADE FROM HYDROXYMETHYL-CONTAINING POLYESTER POLYOLS

(75) Inventors: Eugene Paul Wiltz, Jr., Lake Jackson, TX (US); Zenon Lysenko, Midland, MI (US); Fabio Aguirre, Pfaffikon (CH); Aaron Sanders, Missouri City, TX (US); John Tsavalas, Midland, MI (US); David A. Babb, Lake Jackson, TX (US); Alan K Schrock, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 781 days.

(21) Appl. No.: 10/554,633

(22) PCT Filed: Apr. 23, 2004

(86) PCT No.: PCT/US2004/012529
§ 371 (c)(1),
(2), (4) Date: Oct. 25, 2005

(87) PCT Pub. No.: WO2004/096883
PCT Pub. Date: Nov. 11, 2004

(65) Prior Publication Data
US 2006/0293400 A1 Dec. 28, 2006

(51) Int. Cl.
*C08G 18/28* (2006.01)
(52) U.S. Cl. ........ 521/173; 521/112; 521/130; 521/131; 521/172
(58) Field of Classification Search .......... 521/112, 521/130, 131, 172, 173
See application file for complete search history.

(56) References Cited

U.S. PATENT DOCUMENTS

| | | |
|---|---|---|
| 3,980,688 A | 9/1976 | Litteral et al. |
| 4,216,344 A | 8/1980 | Rogier |
| 4,423,162 A | 12/1983 | Peerman et al. |
| 4,496,487 A | 1/1985 | Peerman et al. |
| 4,534,907 A | 8/1985 | Peerman et al. |
| 4,543,369 A | 9/1985 | Peerman et al. |
| 4,561,922 A | 12/1985 | Peerman et al. |
| 4,857,583 A | 8/1989 | Austin et al. |
| 5,145,879 A | 9/1992 | Budnik et al. |
| 5,472,987 A | 12/1995 | Reedy et al. |
| 5,789,454 A | 8/1998 | McVey |
| 5,981,613 A * | 11/1999 | Cobb et al. .............. 521/112 |
| 2002/0058774 A1 | 5/2002 | Kurth et al. |
| 2002/0090488 A1 | 7/2002 | Kurth et al. |
| 2002/0119321 A1 | 8/2002 | Kurth et al. |
| 2002/0121328 A1 | 9/2002 | Kurth et al. |
| 2003/0191274 A1 | 10/2003 | Kurth et al. |
| 2010/0048753 A1 | 2/2010 | Peng |

FOREIGN PATENT DOCUMENTS

| | | |
|---|---|---|
| CA | 2162083 A | 5/1996 |
| EP | 0 106 491 A2 | 4/1984 |
| EP | 0 254 890 B1 | 2/1988 |
| EP | 0 452 481 B1 | 10/1991 |
| EP | 0 704 468 B1 | 4/1996 |
| EP | 0 712 884 B1 | 5/1996 |
| EP | 0 976 781 A2 | 2/2000 |

* cited by examiner

Primary Examiner — John Cooney

(57) ABSTRACT

Flexible polyurethane foams are prepared by reacting a polyisocyanate with a high equivalent weight polyol. At least a portion of the high equivalent weight polyol is a polyester containing hydroxymethyl groups. The polyester is prepared in a multi-step process from animal or vegetable fats, by recovering the constitutent fatty acids, hydroformylating carbon-carbon double bonds in the fatty acids and reducing to form hydroxymethyl groups, and then forming a polyester by reaction with an initiator compound.

30 Claims, No Drawings

POLYURETHANE FOAMS MADE FROM HYDROXYMETHYL-CONTAINING POLYESTER POLYOLS

The invention relates to flexible polyurethane foams and method to make such foams.

Polyurethane foams are produced by the reaction of polyisocyanates and polyols. The first large scale commercial production of polyurethanes arose using polyester polyols from the ester condensation reaction of diols or polyols and dicarboxylic acids to make flexible foams. The polyester polyols were supplanted by polyether polyols because of their lower cost and the ability to make a wide range of polyols. Polyethers are made by polymerizing epoxides (oxiranes) derived from petroleum feedstocks in the presence of initiator compounds that contain active hydrogen starting compounds, such as low molecular weight polyols and polyamines. Rigid polyurethane foams have been made with castor oil or castor oil byproducts.

Attempts have been made to make polyols from vegetable or renewable feedstocks such as those disclosed by Peerman et al. in U.S. Pat. Nos. 4,423,162; 4,496,487 and 4,543,369. Peerman et al. describe hydroformylating and reducing esters of fatty acids as are obtained from vegetable oils, and forming esters of the resulting hydroxylated materials with a polyol or polyamine. However, Peerman et al., specifically describe problems of gelling, which he avoided by using no greater than 1 mole of the hydroxymethylated material per equivalent of polyol or polyamine. Consequently, Peerman et al.'s esters are low equivalent weight materials that have been shown to be useful only in making crosslinked rigid polyurethanes.

Accordingly, it would be desirable to provide both a flexible polyurethane foam having good properties that are made from a polyol based on a renewable resource.

This invention is a method of preparing a polyurethane foam comprising bringing an organic polyisocyanate into contact with a polyol composition containing a high equivalent weight polyol or mixture of high equivalent weight polyols, in the presence of a blowing agent and a surfactant, under conditions such that the polyisocyanate reacts with the polyol composition and the blowing agent produces a gas, to form a cellular polyurethane and/or polyurea polymer, wherein at least 10% by weight of the high equivalent weight polyol(s) is one or more hydroxymethyl-containing polyester polyols prepared by reacting a hydroxymethyl group-containing fatty acid having from 12-26 carbon atoms, or an ester of such a hydroxymethyl group containing fatty acid, with a polyol or polyamine initiator compound having an average of at least 2 hydroxyl, primary amine and/or secondary amine groups, such that the hydroxymethyl-containing polyester polyol contains an average of at least 1.3 repeating units derived from the hydroxmethyl-group-containing fatty acid or ester per total number of hydroxyl, primary amine and secondary amine groups on the initiator compound, and the hydroxymethyl-containing polyester polyol has an equivalent weight of at least 400 up to 15,000.

Surprisingly, good quality flexible polyurethane foams can be made using these polyester polyols, over a wide concentration range, using processes and formulations that in many cases closely resemble those used to make conventional polyurethane foams based on polyether polyols. This is accomplished even though the molecular structure of these polyester polyols tends to be more variable (among molecules in a sample of the polyester polyol) than that of polyether polyols, in terms of branching, location and spacing of reactive (hydroxyl) groups, and composition of repeating units. Further, the resulting foam often exhibits certain improved properties relative to the conventional polyether polyol-based foams, including improved UV resistance, improved resistance to gas fade discoloration and improved thermal resistance.

The polyol component contains one or more high equivalent weight polyols. By "high equivalent weight polyol", it is meant a polyol having an atomic mass of at least 400 times the total number of hydroxyl, primary amine and secondary amine groups on the polyol molecule.

The hydroxymethyl-containing polyester polyol has an average of at least 2, preferably at least 2.5, more preferably at least 2.8, to about 12, more preferably to about 6, even more preferably to about 5, hydroxyl, primary and secondary amine groups combined per molecule. The hydroxymethyl-containing polyester polyol has an equivalent weight of at least 400, such as at least about 600, at least about 650, at least about 700, or at least about 725, to about 15,000, such as to about 6000, to about 3500, up to about 1700, up to about 1300, or to about 1000. Equivalent weight is equal to the number average molecular weight of the molecule divided by the combined number of hydroxyl, primary amine and secondary amine groups.

The hydroxymethyl-containing polyester polyol is conveniently prepared by reacting a hydroxymethyl-group containing fatty acid having from 12-26 carbon atoms, or an ester of such a hydroxymethylated fatty acid, with a polyol, hydroxylamine or polyamine initiator compound having an average of at least 20 hydroxyl, primary amine and/or secondary amine groups/molecule. Proportions of starting materials and reaction conditions are selected such that the resulting hydroxymethyl-containing polyester polyol contains an average of at least 1.3 repeating units derived from the hydroxmethyl-group containing fatty acid or ester thereof for each hydroxyl, primary amine and secondary amine groups in the initiator compound, and the hydroxymethyl-containing polyester polyol has an equivalent weight of at least 400 up to about 15,000.

The hydroxymethyl-containing polyester polyol advantageously is a mixture of compounds having the following average structure:

wherein R is the residue of an initiator compound having n hydroxyl and/or primary or secondary amine groups, where n is at least two; each X is independently —O—, —NH— or —NR'— in which R' is an inertly substituted alkyl, aryl, cycloalkyl, or aralkyl group, p is a number from 1 to n representing the average number of [X—Z] groups per hydroxymethyl-containing polyester polyol molecule, Z is a linear or branched chain containing one or more A groups, provided that the average number of A groups per molecule is ≧1.3 times n, and each A is independently selected from the group consisting of A1, A2, A3, A4 and A5, provided that at least some A groups are A1, A2 or A3. A1 is:

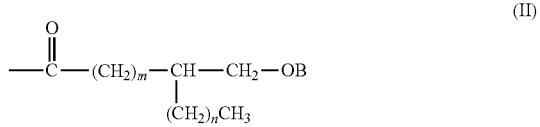

wherein B is H or a covalent bond to a carbonyl carbon atom of another A group; m is number greater than 3, n is greater than or equal to zero and m+n is from 8 to 22, especially from 11 to 19. A2 is:

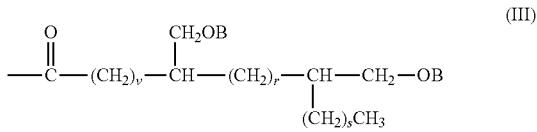

wherein B is as before, v is a number greater than 3, r and s are each numbers greater than or equal to zero with v+r+s being from 6 to 20, especially 10 to 18. A3 is:

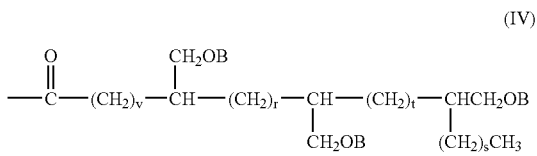

wherein B, v, each r and s are as defined before, t is a number greater than or equal to zero, and the sum of v, r, s and t is from 5 to 19, especially from 10 to 18. A4 is

where w is from 10-24, and A5 is

where R' is a linear or branched alkyl group that is substituted with at least one cyclic ether group and optionally one or more hydroxyl groups or other ether groups. The cyclic ether group may be saturated or unsaturated and may contain other inert substitution. The hydroxyl groups may be on the alkyl chain or on the cyclic ether group, or both. The alkyl group may include a second terminal —C(O)— or —C(O)O— group through which it may bond to another initiator molecule. A5 groups in general are lactols, lactones, saturated or unsaturated cyclic ethers or dimers that are formed as impurities during the manufacture of the hydroxylmethyl-group containing fatty acid or ester. A5 groups may contain 12-50 carbon atoms.

In formula I, n is preferably from 2-8, more preferably from 2-6, even more preferably from 2-5 and especially from about 3-5. Each X is preferably —O—, The total average number of A groups per hydroxymethylated polyol molecule is preferably at least 1.5 times the value of n, such from about 1.5 to about 10 times the value of n, about 2 to about 10 times the value of n or from about 2 to about 5 times the value of n.

A is preferably A1, a mixture of A1 and A2, a mixture of A1 and A4, a mixture of A1, A2 and A4, a mixture of A1, A2 and A3, or a mixture of A1, A2, A3 and A4, in each case optionally containing a quantity of A5. Mixtures of A1 and A2 preferably contain A1 and A2 groups in a mole ratio of 10:90 to 95:5, particularly from 60:40 to 90:10. Mixtures of A1 and A4 preferably contain A1 and A4 groups in a mole ratio of 99.9:0.1 to 70:30, especially in a ratio of from 99.9:0.1 to 85:15. Mixtures of A1, A2 and A4 preferably contain from about 10 to 95 mole percent A1 groups, 5 to 90 percent A2 groups and up to about 30 percent A4 groups. More preferred mixtures of A1, A2 and A4 contain about 25-70 mole-% A1 groups, 15-40% A2 groups and up to 30% A4 groups. Mixtures of A1, A2 and A3 preferably contain from about 30-80 mole-% A1, from 10-60% A2 and from 0.1 to 10% A3 groups. Mixtures of A1, A2, A3 and A4. groups preferably contain from 20 to 50 mole percent A1, 1 to about 65 percent A2, from 0.1 to about 10 percent A3 and up to 30 percent A4 groups. Especially preferred polyester polyols of the invention contain a mixture of about 20-50% A1 groups, 20-50% A2 groups, 0.5 to 4% A3 groups and 15-30% A4 groups. In all cases, A5 groups advantageously constitute from 0-7%, especially from 0-5%, of all A groups.

Preferred mixtures of A groups conveniently contain an average of about 0.8 to about 1.5 —CH$_2$O— groups/A group, such as from about 0.9 to about 1.3 —CH$_2$O— groups/A group or from about 0.95 to about 1.2 —CH$_2$O— groups/A group. Such mixtures of A groups (1) allow the polyester polyol functionality to be governed mainly by the initiator functionality and (2) tend to form less densely branched polyester polyols.

"Inertly substituted" groups are groups that do not react with an isocyanate groups and which do not otherwise engage in side reactions during the preparation of the hydroxymethyl-group containing polyester polyol. Examples of such inert substituents include as aryl, cycloalkyl, silyl, halogen (especially fluorine, chlorine or bromine), nitro, ether, ester, and the like.

Hydroxymethyl-containing polyester polyols according to structure I can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transerterification reaction with a lower alkanol, especially methanol or ethanol, to produce alkyl esters of the constituent fatty acids. The resulting alkyl esters may be hydrolyzed to the corresponding fatty acids if desired, but this step is usually not necessary or desirable. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in U.S. Provisional Patent Application 60/465, 663, filed Apr. 25, 2003, all incorporated herein by reference. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—CH$_2$OH) groups while hydrogenating residual carbon-carbon bonds to remove essentially all carbon-carbon unsaturation. The resulting mixture of hydromethylated fatty acids is then reacted with an initiator compound, with removal of water or lower alkanol to form the polyester polyol.

The initiator contains two or more hydroxyl, primary amine or secondary amine groups, can be a polyol, an alkanol amine or a polyamine. Initiators of particular interest are polyols. Polyether polyol initiators are useful, including polymers of ethylene oxide and/or propylene oxide having from 2-8, especially 2-4 hydroxyl groups/molecule and a molecular weight of about 150-3000, especially from 200-1000.

Hydroxymethyl-containing fatty acids made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bonds unless stringent reaction conditions are used. Carbon-carbon double bonds that are not hydroformylated generally become hydrogenated.

Methods of making such hydroxymethyl-containing polyester polyols are described in U.S. Provisional Patent Application 60/465,685, filed Apr. 25, 2003, incorporated herein by reference.

The hydroxylmethyl-containing polyester polyol so produced generally contains some unreacted initiator compound, and may contain unreacted hydromethylated fatty acids (or esters). Initiator compounds often react only monofunctionally or difunctionally with the fatty acids (or esters), and resulting polyester polyol often contains free hydroxyl or amino groups bonded directly to the residue of the initiator compound.

The hydroxymethyl-containing polyester polyol may be alkoxylated, if desired, to introduce polyether chains onto one or more of the hydroxymethyl groups. The hydroxymethyl-containing polyester polyol may also be aminated through reaction with ammonia or a primary amine, followed by hydrogenation, to replace the hydroxyl groups with primary or secondary amine groups. Primary or secondary amine groups can also be introduced by capping the polyester polyol with a diisocyanate, and then converting the terminal isocyanate groups so introduced to amino groups through reaction with water.

The polyol composition used to make the foam may further include one or more additional high equivalent weight polyols, other than the hydroxymethyl-containing polyester polyol. Suitable such additional high equivalent weight polyols include polyether polyols and polyester polyols. Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers, random copolymers of propylene oxide and ethylene oxide in which the poly(ethylene oxide) content is, for example, from about 1 to about 30% by weight, ethylene oxide-capped poly(propylene oxide) polymers and ethylene oxide-capped random copolymers of propylene oxide and ethylene oxide. For slabstock foam applications, such polyethers preferably contain 2-4, especially 2-3, mainly secondary hydroxyl groups per molecule and have an equivalent weight per hydroxyl group of from about 400 to about 3000, especially from about 800 to about 1750. For high resiliency slabstock and molded foam applications, such polyethers preferably contain 2-4, especially 2-3, mainly primary hydroxyl groups per molecule and have an equivalent weight per hydroxyl group of from about 1000 to about 3000, especially from about 1200 to about 2000. The polyether polyols may contain low terminal unsaturation (for example, less than 0.02 meq/g or less than 0.01 meq/g), such as those made using so-called double metal cyanide (DMC) catalysts, as described for example in U.S. Pat. Nos. 3,278,457, 3,278,458, 3,278,459, 3,404,109, 3,427,256, 3,427,334, 3,427,335, 5,470,813 and 5,627,120. Polyester polyols typically contain about 2 hydroxyl groups per molecule and have an equivalent weight per hydroxyl group of about 400-1500. Polymer polyols of various sorts may be used as well. Polymer polyols include dispersions of polymer particles, such as polyurea, polyurethane-urea, polystyrene, polyacrylonitrile and polystyrene-co-acrylonitrile polymer particles in a polyol, typically a polyether polyol. Suitable polymer polyols are described in U.S. Pat. Nos. 4,581,418 and 4,574,137.

When additional high equivalent weight polyols are used, the hydroxymethyl-containing polyester polyol may constitute at least 10%, at least 25%, at least at least 35%, at least 50%, or at least 65% of the total weight of all high equivalent weight polyols. The hydroxymethyl-containing polyester polyol may constitute 75% or more, 85% or more, 90% or more, 95% or more or even 100% of the total weight of all high equivalent weight polyols. For example, the hydroxymethyl-containing polyester polyol(s) may constitute from 20-65%, 35-65%, 65-100% or 80-100% of the total weight of high equivalent weight polyol(s).

The polyol component may contain one or more crosslinkers in addition to the high equivalent weight polyols described above. However, in many cases it is preferred to use reduced quantities of crosslinkers as compared with conventional polyether polyol-based foam formulations. If used, suitable amounts of crosslinkers are from about 0.1 to about 1 part by weight, especially from about 0.25 to about 0.5 part by weight, per 100 parts by weight high equivalent weight polyols. Using reduced levels of crosslinkers and chain extenders has been found to facilitate a good "blow off", during which cell walls are broken and a good quality, open-celled flexible foam is produced with little or no need to mechanically open the cells. In slabstock and high resiliency slabstock foam formulations, it is often preferred to essentially eliminate crosslinkers and chain extenders, i.e., use from zero to less than 0.25 parts of crosslinker per 100 parts by weight high equivalent weight polyol. It is most preferred to use no added crosslinker.

For purposes of this invention "crosslinkers" are materials having three or more isocyanate-reactive groups per molecule and an equivalent weight per isocyanate-reactive group of less than 400. Crosslinkers preferably contain from 3-8, especially from 3-4 hydroxyl, primary amine or secondary amine groups per molecule and have an equivalent weight of from 30 to about 200, especially from 50-125. Examples of suitable crosslinkers include diethanol amine, monoethanol amine, triethanol amine, mono- di- or tri(isopropanol) amine, glycerine, trimethylol propane, pentaerythritol, and the like.

The polyol component may also contain one or more chain extenders, which for the purposes of this invention means a material having two isocyanate-reactive groups per molecule and an equivalent weight per isocyanate-reactive group of less than 400, especially from 31-125. The isocyanate reactive groups are preferably hydroxyl, primary aliphatic or aromatic amine or secondary aliphatic or aromatic amine groups. Representative chain extenders include amines ethylene glycol, diethylene glycol, 1,2-propylene glycol, dipropylene glycol, tripropylene glycol, ethylene diamine, phenylene diamine, bis(3-chloro-4-aminophenyl)methane and 2,4-diamino-3,5-diethyl toluene. If used, chain extenders are typically present in an amount from about 1 to about 50, especially about 3 to about 25 parts by weight per 100 parts by weight high equivalent weight polyol. Chain extenders are typically omitted from slabstock and high resiliency slabstock foam formulations.

The organic polyisocyanate may be a polymeric polyisocyanate, aromatic isocyanate, cycloaliphatic isocyanate, or aliphatic isocyanate. Exemplary polyisocyanates include m-phenylene diisocyanate, tolylene-2-4-diisocyanate, tolylene-2-6-diisocyanate, hexamethylene-1,6-diisocyanate, tetramethylene-1,4-diiso-cyanate, cyclohexane-1,4-diisocyanate, hexahydrotolylene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4, 4'-diisocyanate, 4,4',4''-triphenyl methane triisocyanate, a polymethylene polyphenylisocyanate (PMDI), tolylene-2,4, 6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2-4-diisocyanate, tolylene-2-6-diisocyanate or mixtures thereof. Diphenylmethane-4,4'-diisocyanate, diphenylmethane-2,4'-diisocyanate and mixtures thereof are generically referred to as MDI, and all can be used. Tolylene-2-4-diisocyanate, tolylene-2-6-diisocyanate and mixtures thereof are generically referred to as TDI, and all can be used.

The amount of polyisocyanate used in making polyurethane is commonly expressed in terms of isocyanate index, i.e. 100 times the ratio of NCO groups to isocyanate-reactive groups in the reaction mixture (including those provided by water if used as a blowing agent). In the production of conventional slabstock foam, the isocyanate index typically ranges from about 95-140, especially from about 105 to 115. In molded and high resiliency slabstock foam, the isocyanate index typically ranges from about 50 to about 150, especially from about 85 to about 110.

The reaction of the polyisocyanate and the polyol component is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially about 2.5-5 parts by weight water are typically used per 100 parts by weight high equivalent weight polyol. Water may also be used in combination with a physical blowing agent, particularly a fluorocarbon or hydrocarbon blowing agent. In addition, a gas such as carbon dioxide, air, nitrogen or argon may be used as the blowing agent in a frothing process.

A surfactant is also used in the foam formulation. A wide variety of silicone surfactants as are commonly used in making polyurethane foams can be used in making the foams of this invention. Examples of such silicone surfactants are commercially available under the tradenames Tegostab™ (Th. Goldschmidt and Co.), Niax™ (GE OSi Silicones) and Dabco™ (Air Products and Chemicals). As discussed in more detail below, certain types of silicone surfactants perform better than others in specific foam formulations that contain a high proportion of the hydroxymethylated polyol. Moreover, the optimal surfactant for use in this invention is sometimes different than that commonly used to make similar types of polyurethane foams using conventional polyether or polyester polyols. The amount of surfactant used will vary somewhat according to the particular application and surfactant that is used, but in general will be between 0.1 and 6 parts by weight per 100 parts by weight high equivalent weight polyol.

The foam formulation will generally include a catalyst. The selection of a particular catalyst package will vary somewhat with the other ingredients in the foam formulation. The catalyst may catalyze the polyol-isocyanate (gelling) reaction or the water-isocyanate (blowing) reaction (when water is used as the blowing agent), or both. In making water-blown foams, it is typical to use a mixture of at least one catalyst that favors the blowing reaction and at least one other that favors the gelling reaction. Formulations containing a high proportion of the hydroxymethylated polyol tend to form tighter foams than formulations mainly containing conventional polyether or polyester polyols. Accordingly, it is often preferred in such instances to use a reduced amount of gelling catalyst and an increased (relative to the amount of gelling catalyst) amount of blowing catalyst, as compared to similar foams made using conventional polyether polyols.

A wide variety of materials are known to catalyze polyurethane forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used. Examples of suitably commercially available surfactants include Niax™ A1 (bis(dimethylaminoethyl)ether in propylene glycol available from GE OSi Silicones), Niax™ B9 (N,N-dimethylpiperazine and N-N-dimethylhexadecylamine in a polyalkylene oxide polyol, available from GE OSi Silicones), Dabco™ 8264 (a mixture of bis(dimethylaminoethyl)ether, triethylenediamine and dimethylhydroxyethyl amine in dipropylene glycol, available from Air Products and Chemicals), and Dabco™ 33LV (triethylene diamine in dipropylene glycol, available from Air Products and Chemicals), Niax™ A-400 (a proprietary tertiary amine/carboxylic salt and bis (2-dimethylaminoethy)ether in water and a proprietary hydroxyl compound, available from GE OSi Silicones); Niax™ A-300 (a proprietary tertiary amine/carboxylic salt and triethylenediamine in water, available from GE OSi Specialties Co.); Polycat™ 58 (a proprietary amine catalyst available from Air Products and Chemicals), Polycat™ 5 (pentamethyl diethylene triamine, available from Air Products and Chemicals) and Polycat™ 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts are generally used in conjunction with one or more tertiary amine catalysts, if used at all. Organotin catalysts tend to be strong gelling catalysts, so they are less preferred than the tertiary amine catalysts and if used, are preferably used in small amounts, especially in high resiliency foam formulations. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the high equivalent weight polyol.

In addition to the foregoing components, the foam formulation may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In general, the polyurethane foam is prepared by mixing the polyisocyanate and polyol composition in the presence of the blowing agent, surfactant, catalyst(s) and other optional ingredients as desired, under conditions such that the polyisocyanate and polyol composition react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the high equivalent weight polyol(s) to form a prepolymer, which is in a second step reacted with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods which are suitable for use in this invention include slabstock foam processes, high resiliency slabstock foam processes, and molded foam methods.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams are typically from about 1 to about 5 pounds per cubic foot (pcf) (16-80 kg/m$^3$) in density, especially from about 1.2 to about 2.0 pcf (19.2-32 kg/m$^3$).

A preferred slabstock foam formulation according to the invention uses water as the primary or more preferably sole blowing agent, and produces a foam having a density of about 1.2 to about 2.0 pcf (19.2-32 kg/m$^3$), especially about 1.2 to about 1.8 pcf (19.2-28.8 kg/m$^3$). To obtain such densities, about 3 to about 6, preferably about 4 to about 5 parts by weight water are used per 100 parts by weight high equivalent weight polyol.

It has been found that in high water slabstock foam formulations such as these, in which the hydroxymethylated polyol constitutes greater than 50%, especially 80-100% of the total weight of high equivalent weight polyols, the foam often tends to have a course cell structure. This problem can be overcome using particular types of silicone surfactants. A preferred type of silicone surfactant for these slabstock foam formulations has a siloxane backbone containing a mixture of high atomic mass polyoxyalkylene pendant groups have an average atomic mass of from about 1400 to about 6000. The silicone backbone preferably also contains low atomic mass polyoxyalkylene pendant groups having an average atomic mass of from about 300 to about 750. It is more preferred that the silicone backbone contains both high and low atomic mass polyoxyalkylene pendant groups which, taken together, have an average atomic mass of about 1000-2000, especially 1100-1800. The silicon surfactant preferably contains about 45-360, especially about 90-260, silicone repeating units/ molecule. Preferably, about 6-30% of such silicon repeating units contain a pendant high or low atomic mass polyoxyalkylene group. Surfactants of these types are described, for example, in U.S. Pat. No. 5,145,879 and EP 0 712 884 B1, both incorporated by reference. From about 1-6, preferably from about 2-4 parts by weight of such surfactants are suitably used per 100 parts by weight high equivalent weight polyols.

The preferred silicon surfactants for these high water/high hydroxymethylated polyol slabstock foam applications can be represented by the formula MD$_x$D'$_y$M, wherein
each M is independently $(CH_3)_3SiO_{1/2}$ or $R(CH_3)_2SiO_{1/2}$;
D is $(CH_3)_2SiO_{1/2}$;
D' is $R(CH_3)SiO_{2/2}$;
x is 40-220, especially 85-220
y is 5-40, especially 8-40, with x/y<10; and
each R is independently a high atomic mass polyether group or a low atomic mass polyether group, provided that a sufficient number of R groups are high atomic mass polyether groups that the average atomic mass of all polyether groups is at least 1000, especially at least 1100. High atomic mass polyether groups R preferably have the structure —$(CH_2)_n(C_2H_4O)_a(CH_2CH(CH_3)O)_b$R', in which n is about 3 to 10, a and b are such that that ethylene oxide residues (i.e., —$C_2H_4O$— groups) constitute from 30-100%, especially 30-50% by weight of the R group and the atomic mass of the R group is about 1400-6000, especially 3500-5000, and R' is hydrogen, alkyl, —C(O)R", —C(O)OR", or —C(O)NHR", where R" is a monofunctional alkyl or aryl group. Low atomic mass polyether groups R preferably have the structure —$(CH_2)_n$ $(C_2H_4O)_a(CH_2CH(CH_3)O)_b$R', in which n is about 3 to 10, a and b are such that that ethylene oxide residues (i.e., —$C_2H_4O$-groups) constitute from 30-100% by weight of the R group, the atomic mass of the R group is about 300-750, and R' is as defined before.

Those surfactants in which x and y are particularly high (such as an x value of 85 or more and a y value of 8 or more in the structure above) tend to have very high viscosities and therefore may mix poorly into the remaining components of the foam formulation. This problem can be overcome by thinning the surfactant with a diluent such as an aliphatic hydrocarbon, aromatic hydrocarbon, ethyoxylated phenol, alkylene benzene, polyether polyol, dipropylene glycol, and the like. Sufficient diluent is preferably used to bring the viscosity of the surfactant blend to below 3000 cP at 25° C.

Two silicone surfactants of particular interest in high water, high hydroxymethylated slabstock foam formulations are Niax™ L-626 and Niax™ L-5614 surfactants, both available from GE OSi Silicones. These materials are high molecular weight silicone surfactant/diluent blends.

It is also preferred to use a tertiary amine catalyst blend and/or tertiary amine/organotin catalyst blend in high water, high hydroxymethylated foam formulations. If a tertiary amine/organotin catalyst blend is used, the amount of organotin catalyst tends to be reduced somewhat compared to amounts used in high water slabstock foam formulations based on conventional polyether polyols, particularly when the hydroxymethylated polyol has an equivalent weight of about 600-800. Particularly useful catalyst packages for high water, high hydroxymethylated slabstock foam formulations are mixtures of stannous octoate with one or more of bis (dimethylaminoethyl)ether, triethylenediamine and dimethylhydroxyethyl amine (such as, for example a mixture of Dabco™ T9 or T95 and Dabco™ 8264 catalysts.

High resilience slabstock (HR slabstock) foam is made in methods similar to those used to make conventional slabstock foam. HR slabstock foams are characterized in exhibiting a Bashore rebound score of 55% or higher, per ASTM 3574.03. These foams tend to be prepared using somewhat higher catalyst levels, compared to conventional slabstock foams, to reduce energy requirements to cure the foam. HR slabstock foam formulations blown only with water tend to use lower levels of water than do conventional slabstock formulations and thus produce slightly higher density foams. Water levels tend to be from about 2 to about 3.5, especially from about 2.5 to about 3 parts per 100 parts high equivalent weight polyols. Foam densities are typically from about 2 to about 5 pcf ($32$-$80$ $kg/m^3$), especially from about 2.1 to about 3 pcf ($33.6$-$48$ $kg/m^3$).

It has been found that water-blown HR slabstock foams made with high amounts of hydroxymethylated polyol (80-100% by weight of all polyols) tend to form "tight" foams with high proportions of closed cells, unless catalyst packages are optimized. Commercial grade HR slabstock foams typically exhibit a "blow-off" during their cure, when the cell walls open and the blowing agent is released. This opening of the cell walls balances internal cell pressures with atmospheric pressure and thus prevents or reduces shrinkage as the foam cools. Water-blown HR slabstock high-hydroxymethylated polyol foam formulations are more likely not to produce this "blow-off". This is particularly the case when the hydroxymethated polyol has an equivalent weight of less than about 700. As a result, these foams tend to shrink unless additional measures are undertaken to open the cells. Such additional measures include, for example, the use of cell openers in the foam formulation, or crushing the foam to mechanically open the cells.

It is believed that these problems are related to an imbalance in the relative rates of the "gelling" and "blowing" reactions as the foam cures. It has been found that measures which slow the gelling reaction allow HR slabstock foams made with high-hydroxymethylated polyol formulations to be made with good "blow-off" and consequently a high proportion of open cells and minimal or no shrinkage. Among such measures include (a) use of a toluene diamine blend containing 25%-40% of the 2,4-isomer; (b) substantial elimination of crosslinkers from the formulation; (c) use of a hydroxymethylated polyol with an equivalent weight of greater than 700, especially greater than 725 up to about 1000; and (d) substantial elimination of organometallic (especially organotin) catalysts from the formulation. Each of these measures can be used singly, or any two or more of these may be used in combination. It is preferred that the water-blown, high hydroxymethylated polyol HR slabstock foam formulation be substantially devoid of croslinkers, contain hydroymethylated polyols of 725 or higher equivalent weight, especially up to about 1000 equivalent weight and be substantially devoid of organometallic catalysts, in particular substantially devoid of organotin catalysts.

Catalysts that are particularly suitable for these water-blown, high hydroxylmethylated foam formulations include a mixture of N,N-dimethylpiperazine and N-N-dimethylhexadecylamine (such as Niax™ B9, available from GE OSi Silicones), and a mixture of triethylenediamine (such as Dabco™ 33LV, available from Air Products and Chemicals) with bis(dimethylaminoethyl)ether (such as Niax™ A1, from GE OSi Silicones). A mixture of a about 4-8 parts, especially 5-6 parts of a 33% triethylenediamine solution to 1 part of a 70% bis(dimethylaminoethyl)ether solution is a particularly suitable catalyst package for such HR slabstock foam formulations. Such mixture is advantageously used in an amount from about 0.2 to about 0.5 parts per 100 parts by weight high equivalent weight polyols.

It has also been found that silicone surfactants as are commonly employed in conventional HR slabstock foam formulations usually can also be used in HR slabstock foam formulations using the hydroxymethylated polyol of the invention. This is the case even in water-blown formulations containing high levels (80-100% by weight of all polyols) of hydroxymethylated polyols. Suitable such surfactants include polysiloxane polymers having terminal or pendant polyether groups. A suitable class of polysiloxane polymers includes those that contain up to about 20 siloxane units (substituted or unsubstituted) per molecule. Such polysiloxane polymers preferably contain about one pendant polyether group per every 3-8 siloxane units. The pendant polyether groups preferably have an average atomic mass of about 200-1000. The pendant polyether groups are preferably polymers of ethylene oxide, propylene oxide or a mixture of ethylene oxide and propylene oxide. Examples of commercially available HR foam surfactants that are useful include Dabco™ DC2585, Dabco™ DC5043 and Dabco™ DC5180 surfactants, available from Air Products, Niax™ U-2000 surfactant, available from GE OSi Silicones, and Tegostab™ B 8681, Tegostab™ B4351, Tegostab™ B8631, Tegostab™ B8707 and Tegostab B8715 surfactants, available from Th. Goldschmidt.

Molded foam can be made according to the invention by transferring the reactants (polyol composition including hydroxymethyl-containing polyester polyol, polyisocyanate, blowing agent, and surfactant) to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resilience molded foam. Densities for molded foams tend to be in the range of 2.0 to about 5.0 pounds per cubic foot ($32$-$80$ $kg/m^3$).

The polyols of the invention are also useful in making foam via a mechanical frothing process. In such processes, air, nitrogen or other gas is whipped into a reacting mixture containing the high equivalent weight polyol(s), a polyisocyanate, and optionally catalysts, surfactants as described before, crosslinkers, chain extenders and other components. The frothed reaction mixture is then typically applied to a substrate where it is permitted to cure to form an adherent cellular layer. A frothing application of particular importance is the formation of carpet with an attached polyurethane cushion. Such carpet-backing processes are described, for example, in U.S. Pat. Nos. 6,372,810 and 5,908,701.

Foam according to the invention exhibits several beneficial and unexpected properties, particularly in comparison to conventional, polyether polyol-based foam. The foam of the invention tends to exhibit improved resistance to exposure to ultraviolet light. The foam of the invention also tends to have increased resistance to so-called gas fade discoloration, which results from exposure to NOx compounds that are commonly present in exhaust fumes. Further, the foam of the invention often exhibits improved thermal stability.

The foam of the invention is useful as furniture cushioning, automotive seating, automotive dashboards, packaging applications, other cushioning and energy management applications, carpet backing, gasketing, and other applications for which conventional polyurethane foams are used.

The following examples are provided to illustrate the invention, but are not intended to limit the scope thereof. All parts and percentages are by weight unless otherwise indicated.

EXAMPLES 1-9

Flexible polyurethane "box" foam Examples 1-9 are made from the polyurethane formulation set forth in Table 1.

Hydroxymethylated polyols constitute from 20-65% of the total weight of high equivalent weight polyols in these formulations.

The hydroxymethylated polyols used in Examples 1-6 are as follows:

Hydroxymethylated polyol A: A polyester made by reacting 9 (10)-hydroxymethylstearate (prepared by hydroformylating and reducing methyl oleate) with a 625 molecular weight, poly(ethylene oxide) triol at a 6.51:1 molar ratio, using 1012 ppm stannous octoate (City Chemical Co.) as the catalyst. The resulting polyester has a viscosity of 2920 cP at 25° C. and a hydroxyl equivalent weight (by end group analysis) of 850. $M_n$ and $M_w$ are measured after removing unreacted starting materials (mainly initiator compound) from the polyester polyol. The polyester has an $M_n$ of 3118, an $M_w$ of 5295, and a polydispersity of 1.7. Hydroxymethylated polyol A has an average of approximately 3.67 hydroxyl groups/molecule. Hydroxymethylated polyol A corresponds to structure I, wherein X is —O— and the A groups are A1 groups in which m is 7 or 8 and n is 8 or 7. The polyester contains an average of about 7.9 A groups/polyester molecule.

Hydroxymethylated polyol B: A polyester made by reacting a mixture of hydroxymethylated soybean fatty acids and 9 (10)-hydroxymethyl stearate with a 625 molecular weight, poly(ethylene oxide) at a 5.99:1 molar ratio, using 827 ppm stannous octoate (City Chemical Co.) as the catalyst. The resulting polyester has a viscosity of 3720 cP at 25° C., a hydroxyl equivalent weight of 761, an $M_n$ of 2678, an $M_w$ of 4270, and a polydispersity of 1.59. Hydroxymethylated polyol B has an average of approximately 3.5 hydroxyl groups/molecule. Hydroxymethylated polyol B corresponds to structure I, wherein X is —O— and n=3. There are on average approximately 6.2 A groups/molecule. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 33.4%, A2 groups constitute about 36.2%, A3 groups constitute about 2.2%, A4 groups constitute about 22.2%, and A5 groups constitute about 5.9% by weight (and approximately equivalent mole percentages). The average hydroxyl functionality of the A groups is about 1.09 and the average weight of the A groups is about 333.

Hydroxymethylated polyol C: A polyester made by reacting a mixture of hydroxymethylated soybean fatty acids with a 625 molecular weight, poly(ethylene oxide) triol at a 6.03:1 molar ratio, using 701 ppm stannous octoate (City Chemical Co.) as the catalyst. The resulting polyester has a viscosity of 3450 cP at 25° C., a hydroxyl equivalent weight of 755, an $M_n$ of 2858, an $M_w$ of 4304, and a polydispersity of 1.51. Hydroxymethylated polyol C has an average of approximately 3.5 hydroxyl groups/molecule. There are on average approximately 6.7 A groups/molecule. Hydroxymethylated polyol C corresponds to structure I, wherein X is —O— and n=3. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 33.3%, A2 groups constitute about 36.3%, A3 groups constitute about 2.2%, A4 groups constitute about 22.2%, and A5 groups constitute about 5.9% by weight (and approximately the same molar percentages). The average hydroxyl functionality of the A groups is about 1.09 and the average weight of the A groups is about 333.

Hydroxymethylated polyol D: A polyester made by reacting a mixture of hydroxymethylated soybean fatty acids and 9 (10)-hydroxymethyl stearate with a 625 molecular weight, poly(ethylene oxide) triol at a 5.98:1 molar ratio, using 1365 ppm stannous octoate (City Chemical Co.) as the catalyst. The resulting polyester has a viscosity of 4100 cP at 25° C., a hydroxyl equivalent weight of 754, an $M_n$ of 2615, an $M_w$ of 4342, and a polydispersity of 1.66. Hydroxymethylated Polyol D has an average of approximately 3.5 hydroxyl groups/molecule. There are on average approximately 5.9 A groups/molecule. Hydroxymethylated Polyol D corresponds to structure I, wherein X is —O— and n=3. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 33.9%, A2 groups constitute about 39.1%, A3 groups constitute about 2.9%, A4 groups constitute about 19.1%, and A5 groups constitute about 5.0% by weight (an approximately the same molar percentages). The average hydroxyl functionality of the A groups is about 1.17 and the average weight of the A groups is about 336.

Hydroxymethylated polyol E: A polyester made by reacting hydroxymethylated soybean fatty acids with a 625 molecular weight, poly(ethylene oxide) triol at a 5.95:1 molar ratio, using 891 ppm stannous octoate (City Chemical Co.) as the catalyst. The resulting polyester has a viscosity of 2730 cP at 25° C., a hydroxyl equivalent weight of 904, an $M_n$ of 2347, an $M_w$ of 3612, and a polydispersity of 1.54. Hydroxymethylated polyol E has an average of approximately 2.6 hydroxyl groups/molecule. There are on average approximately 5.2 A groups/molecule. Hydroxymethylated Polyol E corresponds to structure I, wherein X is —O—, and n=3. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 37.3%, A2 groups constitute about 32.5%, A3 groups constitute about 1.8%, A4 groups constitute about 25.2%, and A5 groups constitute about 3.2% by weight (and approximately the same molar percentages). The average hydroxyl functionality of the A groups is about 1.02 and the average weight of the A groups is about 329.

Polyurethane foam Examples 1-9 are prepared using the following general procedure. All components except the polyisocyanate and organotin catalyst are individually metered and weighed into a one quart capacity metal cup. The contents are premixed for 15 seconds at 1800 rpm using a pin type mixer. The tin catalyst, dispensed by volume, is then added to the stirred components and mixed for an additional 15 seconds at 1800 rpm. The polyisocyanate is then added to the cup and vigorously mixed for 3 seconds at 2400 rpm. The cup contents are then poured into a 15"×15"×10" (45×45×25 cm) wooden box lined with a polyethylene bag. The foam buns are allowed to cure overnight under a ventilated fume hood. They are then placed in ambient storage and submitted for physical property assessment using ASTM test method designation D 3574-95, with results as indicated in Table 1.

TABLE 1

| Example # | 1 | 2 | 3 | 4 | 5 | 6 | 7 | 8 | 9 |
|---|---|---|---|---|---|---|---|---|---|
| Components | | | | | | | | | |
| Polyether Polyol A[1] | 80 | 65 | 50 | 50 | 15 | 35 | 65 | 50 | 65 |
| Polymer Polyol A[2] | 0 | 0 | 0 | 0 | 35 | 0 | 0 | 0 | 0 |
| Hydroxymethylated Polyol A | 20 | 35 | 50 | 0 | 0 | 0 | 0 | 0 | 0 |
| Hydroxymethylated Polyol B | 0 | 0 | 0 | 50 | 0 | 0 | 0 | 0 | 0 |
| Hydroxymethylated Polyol C | 0 | 0 | 0 | 0 | 50 | 50 | 0 | 0 | 0 |
| Hydroxymethylated Polyol D | 0 | 0 | 0 | 0 | 0 | 0 | 35 | 50 | 0 |
| Hydroxymethylated Polyol E | 0 | 0 | 0 | 0 | 0 | 0 | 0 | 0 | 35 |
| Water | 4.5 | 4.5 | 4.5 | 6 | 4.5 | 4.5 | 4.5 | 4.5 | 4.5 |
| Amine Catalyst A[3] | 0.12 | 0.12 | 0.12 | 0.1 | 0.12 | 0.12 | 0.12 | 0.12 | 0.12 |
| Silicone Surfactant A[4] | 1 | 1 | 1 | 1 | 1 | 1 | 1 | 1 | 1 |
| Silicone Surfactant B[5] | 0 | 0 | 0 | 0 | 0 | 1 | 0 | 0 | 0 |
| Organotin Catalyst A[6] | 0.4 | 0.4 | 0.4 | 0.35 | 0.32 | 0.32 | 0.4 | 0.5 | 0.7 |
| TDI-80[7] | 57.8 | 58.2 | 58.5 | 75.1 | 57.5 | 59.4 | 58.4 | 58.9 | 57.5 |
| Isocyanate Index | 110 | 110 | 110 | 110 | 110 | 110 | 110 | 110 | 110 |
| Properties | | | | | | | | | |
| Blow-Off, sec | 96 | 95 | 94 | 107 | 93 | 88 | 126 | 105 | 95 |
| Air Flow cfm (L/s) | 4.2 (1.97) | 4.3 (2.02) | 3.3 (1.55) | 4.3 (2.02) | 4.0 (1.88) | N.D. | 4.3 (2.02) | 2.5 (1.17) | 2.6 (1.22) |
| Comp. Set., 90%, % | 3.7 | 4.3 | 4.4 | N.D. | N.D. | N.D. | 4.2 | 4.9 | 4.3 |
| Density, pcf (kg/m$^3$) | 1.44 (23.0) | 1.54 (24.6) | 1.51 (24.2) | 1.15 (18.4) | 1.48 (23.7) | N.D. | 1.48 (23.7) | 1.41 (22.6) | 1.40 (22.4) |
| 25% IFD, lb. (N/323 cm$^2$) | 39.8 (177) | 41.3 (184) | 43.2 (192) | 33.5 (149) | 37.6 (167) | N.D. | 39.2 (174) | 47.2 (210) | 44.9 (200) |
| 65% IFD, lb. (N/323 cm$^2$) | 71.6 (319) | 76.8 (3420 | 82.1 (365) | 78.8 (351) | 92.3 (411) | N.D. | 76.3 (339) | 92.2 (410) | 84.3 (375) |
| Guide Factor | 27.6 | 26.8 | 28.6 | 29.1 | 25.4 | N.D. | 26.5 | 33.5 | 32.1 |
| Resiliency, % | 38 | 37 | 36 | 34 | 31 | N.D. | 30 | 33 | 33 |
| Tensile, psi (kPa) | 12.7 (87.5) | 12.5 (86.1) | 12.1 (83.4) | N.D. | N.D. | N.D. | 12.2 (84.1) | 13.3 (91.6) | 12.8 (88.2) |
| Tear, pli (N/m) | 1.7 (297) | 1.7 (297) | 1.6 (280) | N.D. | N.D. | N.D. | 1.4 (245) | 1.0 (175) | 1.3 (227) |
| Elongation, % | 104 | 90 | 74 | N.D. | N.D. | N.D. | 69.5 | 67.8 | 83.7 |

Notes to Table 1:
N.D.—not determined.
[1] A 2.7 average functionality, 3100 molecular weight, random copolymer of 87% by weight propylene oxide and 13% by weight ethylene oxide, available as Voranol ™ 3137 polyol from Dow Chemical.
[2] A polymer polyol containing Polyether Polyol A as the base polyol and 43 wt. % styrene/acrylonitrile solids, available as Voranol ™ 3943A polyol from The Dow Chemical Company.
[3] An optimized amine catalyst blend containing bis(dimethylaminoethyl) ether, triethylenediamine and dimethylhydroxyethyl amine, available as D-8264 catalyst from Air Products & Chemicals, Inc.
[4] A silicone surfactant available as DC5160 from Air Products & Chemicals, Inc.
[5] A silicone surfactant available as L-626 from GE OSi Silicones.
[6] A stannous octanoate catalyst available as T-95 catalyst from Air Products and Chemicals.
[7] An 80/20 blend of the 2,6- and 2,4-isomers of toluene diisocyanate.

Foam Examples 1-9 demonstrate that good quality foams can be made using conventional catalyst/surfactant packages when a hydroxymethylated polyol constitutes from about 20-65% of the weight of the high equivalent weight polyols. In all cases, "blow-off" occurs during the foaming process, leading to a good open-celled foam that does not shrink when cooled.

As the content of the hydroxymethylated polyol is increased to 65% by weight of the high equivalent weight polyols, some coarsening of the cell structure is seen when the DC5160 surfactant (Siliocone Surfactant A) is used alone. In example 6, this is overcome by adding a quantity of the L626 surfactant. The L626 surfactant is believed to be a mixture of a silicone surfactant and a diluent, in which the surfactant has the structure $MD_xD'_yM$, wherein each M is independently $(CH_3)_3SiO_{1/2}$ or $R(CH_3)_2SiO_{1/2}$; D is $(CH_3)_2SiO_{1/2}$; D' is $R(CH_3)SiO_{2/2}$; x is 85-220, y is 8-40, and the R groups are mixtures of a 1400-6000 atomic mass polyether group having the structure $—(CH_2)_n(C_2H_4O)_a(CH_2CH(CH_3)O)_bR'$, in which n is about 3 to 10, a and b are such that that ethylene oxide residues (i.e., $—C_2H_4O—$ groups) constitute from 30-100, especially 30-50% by weight of the R group, and a 300-750 atomic mass polyether group having the structure $—(CH_2)_n(C_2H_4O)_a(CH_2CH(CH_3)O)_bR'$, in which n is about 3 to 10, a and b are such that that ethylene oxide residues (i.e., $—C_2H_4O—$ groups) constitute from 30-100 by weight of the R group.

EXAMPLES 10-15

Flexible polyurethane "box" foam Examples 10-15 are made from the polyurethane formulations set forth in Table 2. The foams are prepared and tested in the same general manner as described for Examples 1-9. In these foams, hydroxymethylated polyols constitute the sole high equivalent weight polyol component.

Hydroxymethylated Polyol C is as described above.

Hydroxymethylated polyol F: A polyester made by reacting a mixture of hydroxymethylated soybean fatty acids, 9 (10)-hydroxymethyl stearate and methylstearate with a 625 molecular weight, poly(ethylene oxide) triol at a ~6:1 molar ratio, using tin (II) oleate as the catalyst. The resulting polyester has a viscosity of 3440 cP at 25° C., a hydroxyl equivalent weight of 661, an $M_n$ of 3163, an $M_w$ of 4560, and a polydispersity of 1.47. Hydroxymethylated polyol F has an average of approximately 4.8 hydroxyl groups/molecule. There are on average approximately 7.6 A groups/molecule. Hydroxymethylated Polyol F corresponds to structure I, wherein X is —O— and n=3. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 34.1%, A2 groups constitute about 36.0%, A3 groups constitute about 3.1%, A4 groups constitute about 23.7%, and A5 groups constitute about 3.0% by weight (and approximately the same molar percentages). The average hydroxyl functionality of the A groups is about 1.10 and the average weight of the A groups is about 333.

Hydroxymethylated polyol G: A polyester made by reacting a mixture of hydroxymethylated soybean fatty acids, 9 (10)-hydroxymethyl stearate and methyl stearate with a 625 molecular weight, poly(ethylene oxide) triol at a ~6:1 molar ratio, using tin (II) octoate as the catalyst. The resulting polyester has a viscosity of 3168 cP at 25° C., a hydroxyl equivalent weight of 660 and an $M_n$ of 3770, an $M_w$ of 4647, and a polydispersity of 1.47. Hydroxymethylated polyol G has an average of approximately 4.8 hydroxyl groups/molecule. There are on average approximately 7.6 A groups/molecule. Hydroxymethylated Polyol F corresponds to structure I, wherein X is —O— and n=3. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 34.2%, A2 groups constitute about 36.2%, A3 groups constitute about 3.1%, A4 groups constitute about 23.4%, and A5 groups constitute about 3.0% by weight (and approximately the same molar percentages). The average hydroxyl functionality of the A groups is about 1.10 and the average weight of the A groups is about 333.

surfactant (Silicone Surfactant B, described in Examples 1-9) provides the foam with a fine cell structure and good surface appearance. In these formulations, certain conventional slabstock foam surfactants tend to produce foams having poorer cell structure. Decreasing the amount of organotin catalyst (a gelling catalyst) in Examples 13, 14 and 15 (compared to Examples 10, 11 and 12) results in a better blow-off, resulting in a greater air flow and lower foam density.

EXAMPLES 16-21

Flexible polyurethane slabstock foams Examples 16-21 are made from the polyurethane formulations set forth in Table 3. Hydroxymethylated polyols constitute from 20-50% of the total weight of high equivalent weight polyols in these formulations. The foams are made continuously on a commercial slabstock foam machine (Polymech or UBT) featuring a reciprocating mixing head and separate high pressure injection of all streams except the polyols. The polyols are blended and injected as a single mixture. The polyol and isocyanate temperatures are maintained at around 23° C. The polyol output is 20 kg/min.

Hydroxymethylated Polyol H: A polyester made by reacting hydroxymethylated soybean fatty acids with a 625 molecular weight, poly(ethylene oxide) triol at a ~10:1 molar ratio, using ~1000 ppm stannous octoate (City Chemical Co.) as the catalyst. The polyol is made in two batches which are blended. The blended polyester has a viscosity of 2800-3010 cP at 25° C., a hydroxyl equivalent weight of ~830, an $M_n$ of ~3065, an $M_w$ of ~5085, and a polydispersity of ~1.65. Hydroxymethylated polyol H has an average of approximately 3.7 hydroxyl groups/molecule. Hydroxymethylated Polyol H corresponds to structure I, wherein X is —O— and n=3. Hydroxymethylated polyol A corresponds to structure I, wherein X is —O— and the A groups are A1 groups in which m is 7 or 8 and n is 8 or 7. The polyester contains an average of about 7.7 A groups/polyester molecule.

TABLE 2

| | Example | | | | | |
|---|---|---|---|---|---|---|
| | 10 | 11 | 12 | 13 | 14 | 15 |
| Components | | | | | | |
| Hydroxymethylated Polyol C | 100 | 100 | 100 | 0 | 0 | 0 |
| Hydroxymethylated Polyol F | 0 | 0 | 0 | 100 | 100 | 0 |
| Hydroxymethylated Polyol G | 0 | 0 | 0 | 0 | 0 | 100 |
| Water | 4.5 | 4.5 | 4.5 | 4.5 | 4.5 | 4.5 |
| Amine Catalyst A[1] | 0.12 | 0.12 | 0.12 | 0.12 | 0.12 | 0.12 |
| Silicone Surfactant B[2] | 3 | 3 | 3 | 3 | 3 | 3 |
| Organotin Catalyst A[3] | 0.38 | 0.28 | 0.38 | 0.28 | 0.22 | 0.28 |
| TDI-80[4] | 57.4 | 63.1 | 68.8 | 62.4 | 62.4 | 62.4 |
| Isocyanate Index | 100 | 110 | 120 | 110 | 110 | 110 |
| Properties | | | | | | |
| Blow-Off | N.D. | 87 | 104 | 97 | 103 | 109 |
| Air Flow, cfm (L/s) | 0.91 (0.43) | 0.63 (0.30) | 0.31 (0.15) | 1.16 (0.55) | 1.15 (0.54) | 1.37 (0.64) |
| Density, psi (kg/m$^3$) | 1.56 (25.0) | 1.52 (24.3) | 1.48 (23.7) | 1.38 (22.1) | 1.38 (22.1) | 1.38 (22.1) |
| 25% IFD, lb (N/323 cm$^2$) | 39.6 (176) | 37.8 (168) | 49.6 (221) | 42.7 (190) | 42.1 (187) | 39.2 (174) |
| 65% IFD, lb (N/323 cm$^2$) | 87.9 (391) | 93.6 (417) | 95.5 (425) | 87.9 (391) | 90.0 (400) | 90.2 (401) |
| Guide Factor | 25.4 | 24.9 | 33.5 | 30.9 | 30.5 | 28.4 |
| Resiliency, % | 28 | 29 | 32 | 26 | 26 | 30 |
| Tear Strength, pli (N/m) | N.D. | N.D. | N.D. | 0.5 (8.9) | 0.5 (8.9) | 0.7 (12.5) |
| Tensile Strength, psi (kPa) | N.D. | N.D. | N.D. | 7.2 (49.6) | 7.0 (48.2) | 9.6 (62.0) |
| Elongation, % | N.D. | N.D. | N.D. | 34 | 32 | 44 |

[1-4]See notes 3, 5, 6 and 7 of Table 1.

Foam Examples 10-15 demonstrate that good quality foams can be made when a hydroxymethylated polyol constitutes the sole high equivalent weight polyol. The L626

Hydroxymethylated Polyol I: A polyester made by reacting a mixture of hydroxymethylated soybean fatty acids and 9 (10)-hydroxymethylstearate with a 625 molecular weight, poly(ethylene oxide) triol at a ~6:1 molar ratio, using ~1000 ppm stannous octoate (City Chemical Co.) as the catalyst. The polyol is made in two batches which are blended. The blended polyester has a viscosity of 3570-3940 cP at 25° C., a hydroxyl equivalent weight of ~775, an $M_n$ of ~2625, an $M_w$ of ~4330, and a polydispersity of ~1.65. Hydroxymethylated polyol I has an average of approximately 3.5 hydroxyl groups/molecule. There are on average approximately 6.1 A groups/molecule. Hydroxymethylated Polyol I corresponds to structure I, wherein X is —O— and n=3. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 33.8%, A2 groups constitute about 39.0%, A3 groups constitute about 2.8%, A4 groups constitute about 19.3%, and A5 groups constitute about 5.1% by weight (and approximately the same molar percentages). The average hydroxyl functionality of the A groups is about 1.16 and the average weight of the A groups is about 336.

C., a hydroxyl equivalent weight of ~620, a $M_n$ of ~3547, an $M_w$ of ~5443, and a polydispersity of ~1.57. Hydroxymethylated polyol J has an average of approximately 5.7 hydroxyl groups/molecule. There are on average approximately 8.45 A groups/molecule. Hydroxymethylated Polyol J corresponds to structure I, wherein X is —O— and n=3. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 35.5%, A2 groups constitute about 41.4%, A3 groups constitute about 2.4%, A4 groups constitute about 18.5%, and A5 groups constitute about 2.2% by weight (and approximately the same molar percentages). The average hydroxyl functionality of the A groups is about 1.20 and the average weight of the A groups is about 334.

Hydroxymethylated Polyol K: A polyester made by reacting hydroxymethylated soybean fatty acids with a 625 molecular weight, poly(ethylene oxide) triol at a ~5.5:1 molar ratio, using ~1000 ppm stannous octoate (City Chemical Co.) as the catalyst. The polyester has a viscosity of 2320 cP at 25°

TABLE 3

| | Example # | | | | | |
|---|---|---|---|---|---|---|
| | 16 | 17 | 18 | 19 | 20 | 21 |
| Components | | | | | | |
| Polyether Polyol A[1] | 80 | 65 | 50 | 80 | 65 | 50 |
| Hydroxymethylated Polyol H | 20 | 35 | 50 | 0 | 0 | 0 |
| Hydroxymethylated Polyol I | 0 | 0 | 0 | 20 | 35 | 50 |
| Water | 4.5 | 4.5 | 4.5 | 4.5 | 4.5 | 4.5 |
| Amine Catalyst A[2] | 0.12 | 0.12 | 0.12 | 0.12 | 0.12 | 0.12 |
| Silicone Surfactant A[3] | 1 | 1 | 1 | 1 | 1 | 1 |
| Organotin Catalyst B[4] | 0.2 | 0.2 | 0.2 | 0.16 | 0.14 | 0.12 |
| TDI-80[5] | 57.8 | 58.1 | 58.4 | 57.4 | 58.4 | 58.8 |
| Isocyanate Index | 110 | 110 | 110 | 110 | 110 | 110 |
| Properties | | | | | | |
| Density, kg/m[3] | 21.1 | 21.3 | 21.4 | 22.8 | 23.4 | 22.5 |
| Compression Set, 75%, % | N.D. | N.D. | N.D. | 3.5 | 4.7 | 7.8 |
| CFD, 40%, kPa | 3.9 | 4.3 | 4.5 | N.D. | N.D. | N.D. |
| IFD, 40%, kPa | 156.2 | 168.4 | 175.9 | 166.6 | 167.5 | 187.4 |
| SAG factor | 2.7 | 2.8 | 2.9 | 2.7 | 2.7 | 2.9 |
| Hysteresis, % | 45 | 49 | 53 | N.D. | N.D. | N.D. |
| Resiliency, % | 40 | 36 | 36 | 42 | 39 | 39 |
| Guide Factor | 7.4 | 7.9 | 8.2 | 7.3 | 7.2 | 8.3 |
| Air Flow, cfm (L/s) | 3.1 (1.46) | 2.4 (1.13) | 2.1 (0.99) | 4.5 (2.12) | 4.1 (1.93) | 4.1 (1.93) |
| Tensile Strength, kPa | 89 | 80 | 78 | 60 | 61 | 75 |
| Elongation, % | 142 | 128 | 102 | 279 | 266 | 194 |
| Tear (N/m) | 426 | 337 | 309 | 88 | 93 | 71 |

[1-3,5] See notes 1, 3, 4 and 7 of Table 1.
[4] A stannous octanoate catalyst available as T-9 catalyst from Air Products and Chemicals.

EXAMPLES 22-31

High resiliency slabstock box foams are made and evaluated in the same general manner as described for Examples 1-9, using the formulations set forth in Table 4. Results are reported in Table 4. Density and CFD are measured by DIN EN ISO 845-95 and 3386-1-98, respectively. Airflow, tear and resilience are measured by ASTM D 3671-03. Tensile and elongation are measured by ISO 1798-97. Compressive set is measured by ISO 1856-80.

Hydroxymethylated Polyol J: A polyester made by reacting hydroxymethylated soybean fatty acids with a 625 molecular weight, poly(ethylene oxide) triol at a ~8:1 molar ratio, using ~1000 ppm stannous octoate (City Chemical Co.) as the catalyst. The polyester has a viscosity of 6680 cP at 25°

C., a hydroxyl equivalent weight of ~743, an $M_n$ of ~2738, an $M_w$ of ~3995, and a polydispersity of ~1.46. Hydroxymethylated polyol K has an average of approximately 3.7 hydroxyl groups/molecule. There are on average approximately 6.5 A groups/molecule. Hydroxymethylated Polyol K corresponds to structure I, wherein X is —O— and n=3. The A groups are a mixture consisting mainly of A1 groups in which m+n is 13 or 15, A2 groups in which v+r+s is 14, A3 groups in which, v+r+s+t is 13, A4 groups in which w is 14 or 16, and A5 groups. Of the total number of A groups, the A1 groups constitute about 40.9%, A2 groups constitute about 29.4%, A3 groups constitute about 1.8%, A4 groups constitute about 26.6%, and A5 groups constitute about 1.3% by weight (and approximately the same molar percentages). The average hydroxyl functionality of the A groups is about 1.0 and the average weight of the A groups is about 326.

TABLE 4

| Components | \multicolumn{10}{c}{Example #} |
|---|---|---|---|---|---|---|---|---|---|---|
| | 22 | 23 | 24 | 25 | 26 | 27 | 28 | 29 | 30 | 31 |
| Polymer Polyol B[1] | 20 | 0 | 0 | 0 | 0 | 0 | 0 | 0 | 0 | 0 |
| Cell opener A[2] | 0.5 | 0.5 | 0.5 | 1.0 | 1.0 | 1.0 | 1.0 | 0 | 0 | 0 |
| Hydroxymethylated Polyol J | 80 | 100 | 100 | 100 | 100 | 100 | 100 | 100 | 100 | 0 |
| Hydroxymethylated Polyol K | 0 | 0 | 0 | 0 | 0 | 0 | 0 | 0 | 0 | 100 |
| Water | 3.0 | 3.0 | 3.0 | 3.0 | 3.0 | 3.0 | 3.0 | 3.0 | 3.0 | 3.0 |
| Diethanolamine, 99% | 1.5 | 1.5 | 1.5 | 1.5 | 1.5 | 1.5 | 0.5 | 0 | 0 | 0 |
| Amine Catalyst B[3] | 0.15 | 0.15 | 0.15 | 0.15 | 0.15 | 0.15 | 0.15 | 0 | 0 | 0.30 |
| Amine Catalyst C[4] | 0.05 | 0.05 | 0.05 | 0.05 | 0.05 | 0.05 | 0.05 | 0 | 0 | 0.05 |
| Amine Catalyst D[5] | 0 | 0 | 0 | 0 | 0 | 0 | 0 | 1.0 | 1.0 | 0 |
| Organotin Catalyst B[6] | 0.15 | 0.15 | 0.05 | 0.05 | 0 | 0 | 0 | 0 | 0 | 0 |
| Silicone Surfactant C[7] | 0.30 | 0.30 | 0.30 | 0.30 | 0.30 | 0.30 | 0.30 | 0.30 | 0.30 | 0.30 |
| TDI-80[8] | 49 | 49 | 49 | 49 | 49 | 47 | 44 | 35 | 40 | 42.7 |
| TDI-65[3] | 0 | 0 | 0 | 0 | 0 | 0 | 0 | 5 | 0 | 0 |
| Isocyanate Index | 105 | 105 | 105 | 105 | 105 | 100 | 100 | 100 | 100 | 105 |
| Properties | | | | | | | | | | |
| Cream Time, sec | 12 | 10 | 10 | 10 | 10 | 10 | 10 | 10 | 10 | 10 |
| Rise Time, sec | 124 | 105 | 115 | 115 | 118 | 120 | 120 | 145 | 145 | 135 |
| Blow-Off | No | No | No | No | No | No | No | Yes | Yes | Yes |
| Density, kg/m | 27.1 | 27.5 | 29.4 | 29.0 | 30.9 | 30.0 | 30.2 | 35.7 | 34.6 | 36.6 |
| CFD, 40%, kPa | 3.2 | 2.8 | 3.0 | 2.6 | 3.0 | 2.6 | 3.0 | 4.6 | 4.6 | 4.4 |
| Air Flow, cfm (L/s) | 1.3 (0.61) | 2.4 (1.13) | 2.7 (1.27) | 4.0 (1.88) | 3.8 (1.79) | 2.7 (1.27) | 3.4 (1.60) | 2.2 (1.03) | 2.1 (0.99) | 2.8 (0.94) |
| Resiliency, % | 29 | 29 | 25 | 25 | 25 | 25 | 25 | 26 | 26 | 34 |
| Tensile, kPa | 332 | 34 | 29 | 29 | 26 | 25 | N.D. | 40 | 41 | 36 |
| Elongation, % | 64 | 60 | 73 | 72 | 67 | 72.3 | N.D. | 71 | 75 | 64 |
| Tear, N/m | 117 | 83 | 120 | 111 | 95 | 100 | N.D. | 169 | 149 | 108 |
| Comp. Set., 75%, % | 7.2 | 8.6 | 4.7 | 4.6 | 5.4 | 3.7 | N.D. | 9.2 | 11 | 14 |
| Comp. Set., 90%, % | 9.6 | 7.9 | 5.8 | 5.3 | 5.5 | 4.4 | N.D. | 12 | 13 | 20 |

Notes to Table 4:
N.D.—not determined.
[1] A polymer polyol containing a 3000 molecular weight polyether triol as a base polyol and 40 wt. % styrene/acrylonitrile solids, available as Voralux ™ HL 400 polyol from The Dow Chemical Company.
[2] A ~7-functional, 1800 equivalent weight random copolymer of propylene oxide and ethylene oxide, commercially available as Voranol ® 4053 from Dow Chemical.
[3] A 33% triethylene diamine solution available commercially as Dabco ™ 33LV, from Air Products & Chemicals.
[4] A bis(dimethylaminoethyl)ether catalyst commercially available from GE OSi Silicones as Niax ™ A1 catalyst.
[5] A mixture of N,N-dimethylpiperazine and N-N-dimethylhexadecylamine, commercially available as Niax ™ B9, available from GE OSi Silicones.
[6] See note 4 to Table 3.
[7] Tegostab B8681LF surfactant, commercially available from Th. Goldschmidt.
[8] See note 7 to Table 1.
[9] A 65/35 mixture of the 2,6- and 2,4-isomers of toluene diisocyanate.

All of Foam Examples 22-31 have good properties. Foam Examples 22-28 are very "tight" foams which need to be crushed heavily to open the cells and obtain good airflow and minimal shrinkage. None of Examples 22-28 exhibits a "blow-off". Examples 24-31 illustrate various approaches to modify the base foam formulation of Example 23 to obtain blow-off and reduce the need for crushing. In Examples 24-28, the amount of organotin (gelling) catalyst is reduced and then eliminated, and the amount of cell opener is increased. In Example 29, the gelling reaction is delayed by using a toluene diisocyanate blend having a higher content of the 2,4-isomer, eliminating the crosslinker (diethanolamine) and by a change of catalyst. In Example 30, the crosslinker is again eliminated, the same catalyst is used as in Example 29, and the same toluene diisocyanate is used as in Examples 23-28. In both instances, the selection of catalysts allows a blow-off to occur and foam that requires only light crushing is obtained, even though no cell opener is used. In Example 31, an elimination of crosslinker and an increase in triethylene diamine (blowing) catalyst (compared to Example 23) results in an acceleration of the blowing reaction, resulting in good blow-off and a need for only light crushing.

EXAMPLES 32-40

Polyurethane foam Examples 32-40 are molded foams prepared using the following general procedure. All components except the polyisocyanate are individually metered and weighted into a two-liter cup. The contents are mixed for 20 seconds at high speed using an impeller-plus-ring type mixer. The polyisocyanate is added and mixed vigorously for three seconds. The contents of the cup are then poured into a 40×40×10 cm aluminum mold that is heated at 60° C. Demolding time is 5 minutes. Foams are crushed after demolding, and then stored at 25° C. and 50 relative humidity for 48 hours. The foam formulations and physical properties of the resulting foams are set forth in Tables 5 & 6. CFD, tensile strength, elongation, airflow, tear strength, resilience, and compression set are measured according to ASTM D 3574-03. Density is measured according to DIN EN ISO 845-95. Hardness loss after fatigue is measured using DIN EN SO 3385-95. Wet compression set is measured according to BS 4443-7-92.

TABLE 5

| | Example # | | | | | | | | |
|---|---|---|---|---|---|---|---|---|---|
| | 32 | 33 | 34 | 35 | 36 | 37 | 38 | 39 | 40 |
| Components | | | | | | | | | |
| Polyether Polyol B[1] | 70.00 | 60.00 | 50.00 | 70.00 | 70.00 | 70.00 | 60.00 | 50.00 | 40.00 |
| Polymer Polyol C[2] | 20.00 | 20.00 | 20.00 | 20.00 | 20.00 | 20.00 | 20.00 | 20.00 | 20.00 |
| Hydroxymethylated Polyol H | 10.00 | 20.00 | 30.00 | 10.00 | 10.00 | | | | |
| Hydroxymethylated Polyol I | | | | | | 10.00 | 20.00 | 30.00 | 40.00 |
| Cell Opener B[3] | | | | 1.00 | | | | | |
| Amine Catalyst E[4] | | | | | 0.30 | | | | |
| Amine Catalyst F[5] | 0.25 | 0.25 | 0.25 | 0.25 | 0.25 | 0.25 | 0.25 | 0.25 | 0.25 |
| Amine Catalyst G[6] | 0.10 | 0.10 | 0.10 | 0.10 | 0.10 | 0.10 | 0.10 | 0.10 | 0.10 |
| Silicone Surfactant D[7] | 0.80 | 0.80 | 0.80 | 0.80 | 0.80 | 0.80 | 0.80 | 0.80 | 0.80 |
| Amine Catalyst B[8] | 0.30 | 0.30 | 0.30 | 0.30 | 0.30 | 0.30 | 0.30 | 0.30 | 0.30 |
| Silicone Surfactant E[9] | 0.20 | 0.20 | 0.20 | 0.20 | 0.20 | 0.20 | 0.20 | 0.20 | 0.20 |
| Diethanolamine (100%) | 1.00 | 1.00 | 1.00 | 1.00 | 1.00 | 1.00 | 1.00 | 1.00 | 1.00 |
| WATER | 3.70 | 3.70 | 3.70 | 3.70 | 3.70 | 3.70 | 3.70 | 3.70 | 3.70 |
| TDI-80 (index) | 100 | 100 | 100 | 100 | 100 | 100 | 100 | 100 | 100 |

Notes to Table 5:
[1] A 4.7 functional, 1750 equivalent weight poly(propylene oxide) with a 15% ethylene oxide cap, available as Specflex ™ NC-632 from the Dow Chemical Company.
[2] A 40% solids (styrene-acrylonitrile) polymer polyol having as a base polyol a 3.0 functional, 1580 equivalent weight poly(propylene oxide with a 17% ethylene oxide cap, available as Specflex ™ NC-700 from Dow Chemical.
[3] A polyether cell opener available as Voranol ® CP 1421 from Dow Chemical.
[4] An amine catalyst commercially available as Polycat ™ 58 from Air Products and Chemicals.
[5] A proprietary tertiary amine/carboxylic salt and triethylenediamine in water, commercially available as Niax ™ A-300 from GE OSi Silicones.
[6] A proprietary tertiary amine/carboxylic salt and bis (2-dimethylaminoethyl)ether in water and a proprietary hydroxyl compound, commercially available as Niax ™ A-400 from GE Osi Silicones.
[7] A silicone surfactant commercially available as Tegostab ™ B8708 surfactant from Th. Goldschmidt.
[8] See note 3 of Table 4.
[9] A silicone surfactant available commercially as Dabco ™ DC 5164 surfactant.

TABLE 6

| Foam Properties | 32 | 33 | 34 | 35 | 36 | 37 | 38 | 39 | 40 |
|---|---|---|---|---|---|---|---|---|---|
| Core Density, kg/m$^3$ | 32.1 | 32.8 | 33.2 | 33.5 | 33.0 | 35.4 | 36.8 | 35.5 | 33.8 |
| CFD 50%, kPa | 4.9 | 5.5 | 5.6 | 5.0 | 4.7 | 5.6 | 6.6 | 6.2 | 6.4 |
| Tensile Strength, pKa | 106 | 114 | 125 | 109 | 102 | 107 | 134 | 109 | 107 |
| Elongation, % | 104 | 101 | 106 | 105 | 100 | 103 | 107 | 93 | 84 |
| Tear Strength, N/m | 281 | 271 | 284 | 255 | 266 | 223 | 220 | 237 | 198 |
| Resilience, % | 58 | 57 | 55 | 57 | 61 | 53.5 | 52 | 48.5 | 43.5 |
| Air Flow, cfm (L/s) | 1.61 (0.76) | 2.49 (1.17) | 1.68 (0.79) | 2.28 (1.07) | 2.62 (1.23) | 1.0 (0.47) | 1.7 (0.80) | 1.5 (0.71) | 1.3 (0.61) |
| Hardness loss after fatigue, % | N.D. | N.D. | N.D. | N.D. | N.D. | 32 | 34 | 37 | 40 |
| Compression Set 50%, % | 6.5 | 6.4 | 8.1 | 6.0 | 6.2 | 7 | 8 | 10 | 12 |
| Compression Set 90%, % | 11.3 | 11.3 | 13.5 | 8.7 | 9.7 | 9 | 10 | 14 | 17 |
| Wet Compression set 70%, % | 21.3 | 20.7 | 24.3 | 17.0 | 22.1 | 17 | 20 | 22 | 24 |

EXAMPLE 41

Comparative Samples A and B

Gas Fade Discoloration and UV Resistance Evaluations

Example 7 is repeated, except that the level of T-95 catalyst is increased to 0.55 parts by weight. The resulting foam has properties similar to those of Example 7.

Comparative Sample A is made in the same general manner as Example 7, using 100 parts Polyether Polyol A, 4.5 parts water, 1 part Silicone Surfactant A, 0.12 parts of Amine Catalyst A, 0.4 parts of T-95 catalyst and TDI at a 110 index. Comparative Sample A has a density of 1.44 pfc (23 kg/m$^3$) and an airflow of 4.5 cfm (2.1 L/s).

Comparative Sample B is made in the same general manner as Example 7, using 100 parts of a ~3100 molecular weight, ~2.7 functional polyether polyol commercially available from Dow Chemical as Voranol™ 3136 polyol, 4.5 parts water, 1 part Silicone Surfactant A, 0.12 parts of Amine Catalyst A, 0.35 parts of T-95 catalyst and TDI at a 110 index. Comparative Sample A has a density of 1.38 pfc (22.1 kg/m$^3$) and an airflow of 5.12 cfm (2.4 L/s).

Gas fade discoloration evaluations are performed on Comparative Samples A and B and Examples 8, 13 and 41. A 3×3×1 inch (7.5×7.5×2.5 cm) block of each is prepared. Initial color ("b", or yellow/blue on the calorimeter, plus total color) is determined for each block using a Hunter colorimeter. All foam samples are approximately equal in yellowness ("b" value) and total color. Each block is then suspended on a rotating carousel in a fume chamber above a burning methane fuel source, so that exhaust vapors from the burning fuel fill the chamber and contact the foam. Comparative Sample A and Examples 8 and 41 are tested together, and Comparative Sample B and Example 13 are tested together in a separate experiment. Temperature in the chamber is maintained at about 130-140° F. (54-60° C.). The samples are removed after 60 minutes and the yellowness and total color again measured. The change in color indicates the discoloration caused by exposure to the exhaust fumes (which contain NO$_x$ compounds that are believed to be the discoloration agents). Results are as indicated in Table 7.

TABLE 7

| Example or Comp. Sample No. | Hydroxyl-methyl-containing polyester polyol | ΔA (total color) | | | ΔB (yellowness) | | |
|---|---|---|---|---|---|---|---|
| | | Init. | 1 hr. | Change | Init. | 1 hr. | Change |
| A* | 0 | −0.26 | 0.585 | 0.845 | 2.27 | 16.37 | 14.10 |
| 41 | 35% | 0.47 | 0.37 | −0.10 | 2.77 | 14.75 | 11.98 |
| 8 | 50% | −0.16 | 0.24 | 0.40 | 1.55 | 13.23 | 11.68 |
| B* | 0% | 0.83 | 2.91 | 1.08 | −1.48 | 6.63 | 8.11 |
| 13 | 100% | 0.89 | 0.28 | −0.61 | −1.49 | 4.74 | 6.23 |

*Not an example of the invention.

All samples of the invention exhibit a marked improvement in discoloration, compared with the respective controls. Yellowness is the color change most apparent with gas fade discoloration. As such, changes in yellowness, as indicated by the ΔB values, are of primary importance. Yellowness is reduced both in terms of absolute value and degree of change in the examples of the invention.

UV Resistance Evaluations

Examples 15 and 41 and Comparative Sample B are evaluated for UV resistance. Foam samples are evaluated for UV resistance by measuring color changes that occur during exposure to UV light. UV light is supplied by B 313 fluorescent tubes. Multiple samples are evaluated, and results are reported as an average of the samples. Color is measured using a Hunter calorimeter, using yellowness measurements (ΔB) as the criterion for comparison, as yellowness is the dominant apparent color change that is observed with UV degradation of polyurethane foam. Results are as indicated in Table 8.

TABLE 8

| Example or Comp. Sample No. | % Hydroxymethyl-containing polyester polyol | ΔB | | | |
|---|---|---|---|---|---|
| | | Init. | 1 hr | 2 hr | 3 hr |
| B | 0 | 0.18 | 13.31 | 18.13 | 20.80 |
| 41 | 35 | −0.26 | 9.35 | 13.59 | 16.47 |
| 15 | 100 | −0.44 | 5.62 | 9.33 | 10.69 |

*Not an example of the invention.

Smaller numbers in the 1-, 2- and 3-hour columns of Table 8 denote less yellowing and therefore better UV resistance. The data in Table 8 indicates that the foam samples have better UV resistance with increasing hydroxymethyl-containing polyester polyol content.

What is claimed is:

1. A method of preparing a flexible polyurethane foam comprising bringing an organic polyisocyanate into contact with a polyol composition containing a high equivalent weight polyol or mixture of high equivalent weight polyols, in the presence of a blowing agent that includes water, and a surfactant, under conditions such that the polyisocyanate reacts with the polyol composition and the blowing agent produces a gas, to form a cellular polyurethane and/or polyurea polymer, wherein at least 10% by weight of the high equivalent weight polyol(s) is one or more hydroxymethyl-containing polyester polyols prepared by reacting a hydroxymethyl group-containing fatty acid having from 12-26 carbon atoms, or an ester of such a hydroxymethyl group containing fatty acid, with a polyol or polyamine initiator compound having an average of at least 2 hydroxyl, primary amine and/or secondary amine groups, such that the hydroxymethyl-containing polyester polyol contains an average of at least 1.3 repeating units derived from the hydroxmethyl-group-containing fatty acid or ester per total number of hydroxyl, primary amine and secondary amine groups in the initiator compound, and the hydroxymethyl-containing polyester polyol has an equivalent weight of at least 650 up to 15,000, and further wherein the hydroxymethyl-containing polyester polyol has following average structure:

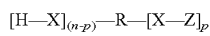

wherein R is the residue of a polyether polyol initiator compound having n hydroxyl groups, where n is at least two; each X is independently —O—, —NH— or —NR'— in which R' is an inertly substituted alkyl, aryl, cycloalkyl, or aralkyl group, p is a number from 1 to n representing the average number of [X—Z] groups per hydroxymethyl-containing polyester polyol molecule, Z is a linear or branched chain containing one or more A groups, provided that the average number of A groups per molecule is ≧1.3 times n, and the A groups include A1, A2, A3 and A4 groups and optionally A5 groups wherein the A1 groups constitute from 20 to 50 mole percent of the A groups, the A2 groups constitute from 1 to 65 mole percent of the A groups, the A3 groups constitute from 0.1 to 10 mole percent of the A groups, the A4 groups constitute up to 30 mole percent of the A groups and the A5 groups constitute up to 7 mole percent of of the A groups, and the A groups contain an average of from 0.95 to 1.2 —CH$_2$O— groups/A group, wherein A1 is:

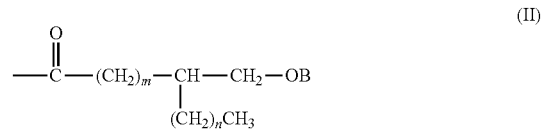

wherein B is H or a covalent bond to a carbonyl carbon atom of another A group; m is number greater than 3, n is greater than or equal to zero and m+n is from 11 to 19; A2 is:

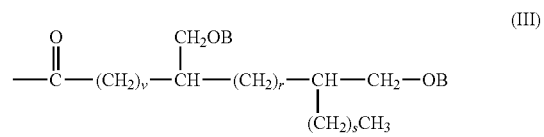

wherein B is as before, v is a number greater than 3, r and s are each numbers greater than or equal to zero with v+r+s being from 10 to 18, A3 is:

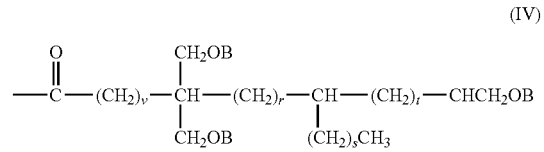

wherein B, v, each r and s are as defined before, t is a number greater than or equal to zero, and the sum of v, r, s and t is from 10 to 18; A4 is

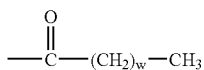

where w is from 10-24, and A5 is

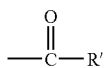

where R' is a linear or branched alkyl group that is substituted with at least one cyclic ether group and optionally one or more hydroxyl groups or other ether groups.

2. The method of claim 1, wherein the equivalent weight of the hydroxymethyl-containing polyester polyol is from about 700 to about 3500.

3. The method of claim 2, wherein the hydroxymethyl-containing polyester polyol contains an average of about 2.5 to about 5 hydroxyl, primary amine or secondary amine groups per molecule.

4. The method of claim 3, which is a free-rise process to produce slabstock polyurethane foam.

5. The method of claim 4, wherein the hydroxymethyl-containing polyester polyol constitutes about 35-100% by weight of the high equivalent weight polyol(s).

6. The method of claim 5, wherein the polyurethane foam has a density of about 1.2 to about 2.0 pounds per cubic foot.

7. The method of claim 6, wherein the hydroxymethyl-containing polyester polyol constitutes about 80-100% by weight of the high equivalent weight polyol(s).

8. The method of claim 7, wherein the surfactant is represented by the formula $MD_xD'_yM$, wherein
each M is independently $(CH_3)_3SiO_{1/2}$ or $R(CH_3)_2SiO_{1/2}$;
D is $(CH_3)_2SiO_{1/2}$;
D' is $R(CH_3)SiO_{2/2}$;
x is 40-220, y is 5-40, x/y<10; and
each R is independently a high atomic mass polyether group or a low atomic mass polyether group, provided that a sufficient number of R groups are high atomic mass polyether groups that the average atomic mass of all polyether groups is at least 1000, especially at least 1100.

9. The method of claim 3, which is a free-rise process to produce high resiliency slabstock polyurethane foam.

10. The method of claim 9, wherein the hydroxymethyl-containing polyester polyol constitutes about 35-100% by weight of the high equivalent weight polyol(s).

11. The method of claim 10, wherein the foam has a density of about 2.0 to about 5 pounds per cubic foot.

12. The method of claim 11, wherein the equivalent weight of the hydroxymethyl-containing polyester polyol is from about 700 to about 1000.

13. The method of claim 12, wherein the surfactant contains up to about 20 siloxane units per molecule and contain about one pendant polyether group per every 3-8 siloxane units, wherein the pendant polyether groups are preferably polymers of ethylene oxide, propylene oxide or a mixture of ethylene oxide and propylene oxide that have an average atomic mass of about 200-1000 daltons.

14. The method of claim 13, which is conducted in the absence of an organotin catalyst.

15. The method of claim 12, wherein the hydroxymethyl-containing polyester polyol constitutes about 35-65% of the total weight of the high equivalent weight polyol(s).

16. The method of claim 3 wherein the polyol composition and the polyisocyanate composition react within a closed mold.

17. The method of claim 16, wherein the hydroxymethyl-containing polyester polyol constitutes about 10-50% of the total weight of the high equivalent weight polyol(s).

18. The process of claim 17 which is a hot-molding process.

19. The process of claim 17 which is a cold-molding process.

20. A polyurethane foam made in the method of claim 1.

21. A polyurethane foam made in the method of claim 4.

22. A polyurethane foam made in the method of claim 7.

23. A polyurethane foam made in the method of claim 8.

24. A polyurethane foam made in the method of claim 9.

25. A polyurethane foam made in the method of claim 13.

26. A polyurethane foam made in the method of claim 16.

27. The method of claim 1 wherein R is the residue of a polymer of ethylene oxide, propylene oxide or ethylene oxide and propylene oxide.

28. The method of claim 27 where R is the residue of a polymer of ethylene oxide, propylene oxide or ethylene oxide and propylene oxide having from 2 to 8 hydroxyl groups per molecule and a molecular weight of about 150 to 3000.

29. The method of claim 28 wherein R is the residue of a polymer of ethylene oxide having from 2 to 8 hydroxyl groups per molecule and a molecular weight of about 150 to 3000.

30. The method of claim 1 wherein the A1 groups constitute from 20 to 50 mole percent of the A groups, the A2 groups constitute from 20 to 50 mole percent of the A groups, the A3 groups constitute from 0.5 to 4 mole percent of the A groups, the A4 groups constitute from 15 to 30 mole percent of the A groups and the A5 groups constitute up to 5 mole percent of the A groups.

* * * * *